Figure 1:
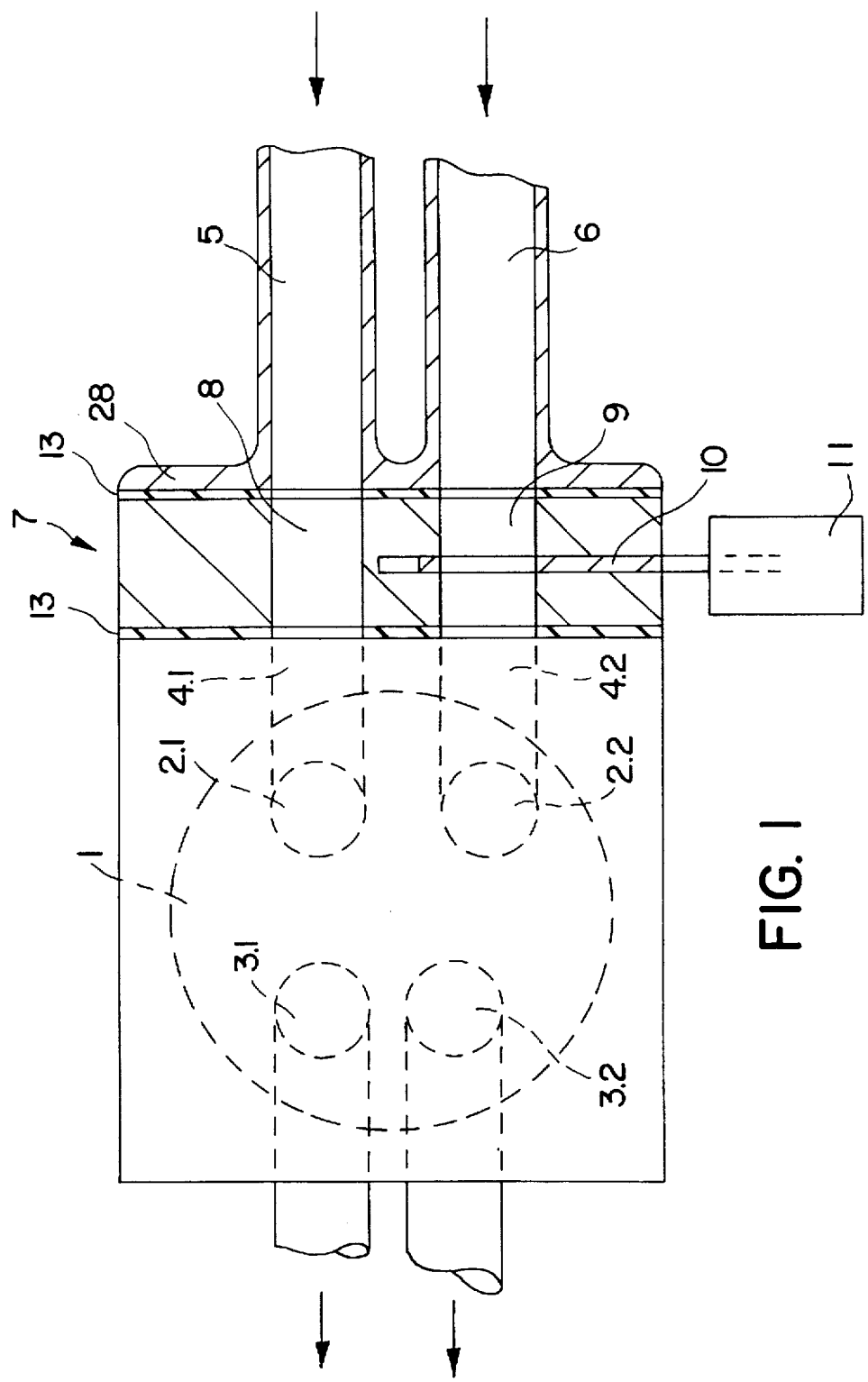

United States Patent [19]

Schellhase et al.

[11] Patent Number: 5,778,851
[45] Date of Patent: Jul. 14, 1998

[54] PISTON-TYPE INTERNAL COMBUSTION ENGINE HAVING AT LEAST TWO INTAKE VALVES PER CYLINDER

[75] Inventors: Torsten Schellhase, Baesweiler; Raymund Tensing; Martin Pieper, both of Aachen, all of Germany

[73] Assignee: FEV Motorentechnik GmbH & Co. KG, Aachen, Germany

[21] Appl. No.: 642,664

[22] Filed: May 3, 1996

[30] Foreign Application Priority Data

May 3, 1995 [DE] Germany ............ 295 07 321.7

[51] Int. Cl.$^6$ .................................................. F02D 9/08
[52] U.S. Cl. .................. 123/337; 123/336; 123/432; 123/308
[58] Field of Search .................. 123/308, 432, 123/336, 337

[56] References Cited

U.S. PATENT DOCUMENTS

| | | | |
|---|---|---|---|
| 5,150,677 | 9/1992 | Aoyama | 123/308 |
| 5,167,211 | 12/1992 | Fukuma et al. | 123/308 |
| 5,454,357 | 10/1995 | Elder | 123/337 |

FOREIGN PATENT DOCUMENTS

| | | | |
|---|---|---|---|
| 38 14 835 | 12/1988 | Germany | |
| 38 36 550 | 6/1992 | Germany | |
| 4109418 | 9/1992 | Germany | 123/337 |
| 39 03 831 | 1/1993 | Germany | |
| 36 24 899 | 2/1993 | Germany | |
| 3199632 | 8/1991 | Japan | 123/337 |
| 4183941 | 6/1992 | Japan | 123/337 |
| 510159 | 1/1993 | Japan | 123/337 |
| 6146935 | 5/1994 | Japan | 123/337 |

*Primary Examiner*—Erick R. Solis
*Attorney, Agent, or Firm*—Spencer & Frank

[57] ABSTRACT

An internal combustion engine includes an engine cylinder; a first intake port leading to the cylinder for introducing combustion gases thereinto; a first intake valve situated at the cylinder in the first intake port; a second intake port leading to the cylinder for introducing combustion gases thereinto; a second intake valve situated at the cylinder in the second intake port; and a throttle arrangement situated in the second intake port for varying a flow passage cross section thereof. The throttle arrangement includes a flat sliding member movable in a direction of motion thereof perpendicularly to the longitudinal axis of the second intake port for varying the flow passage cross section thereof.

8 Claims, 5 Drawing Sheets

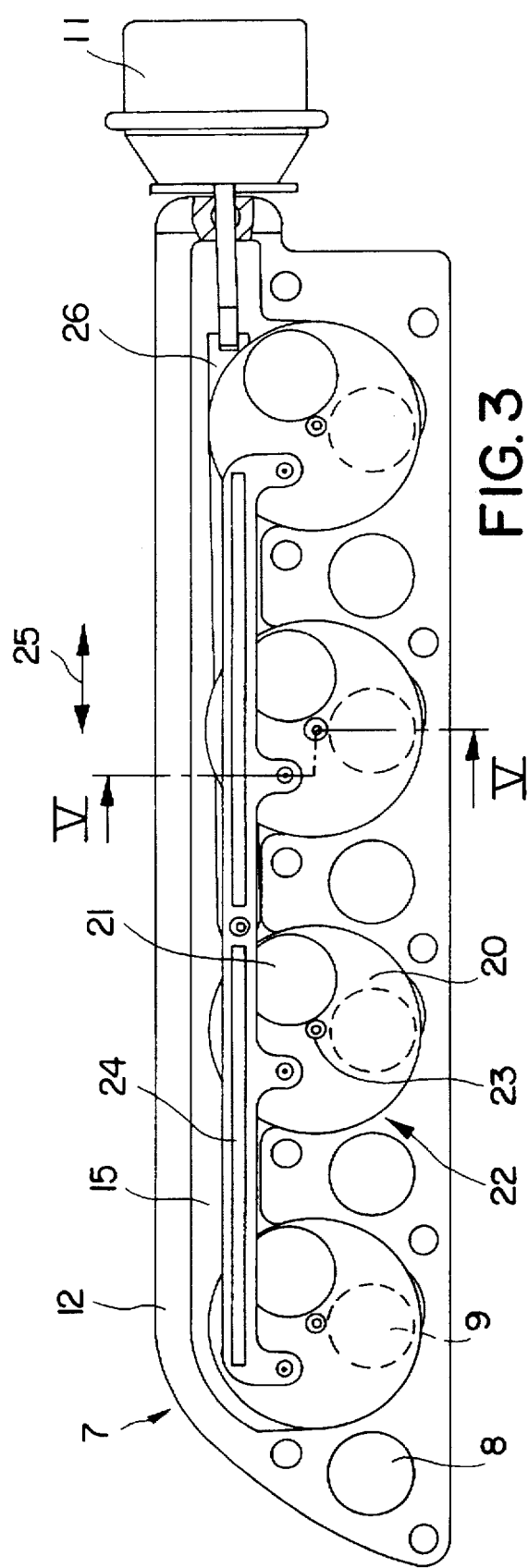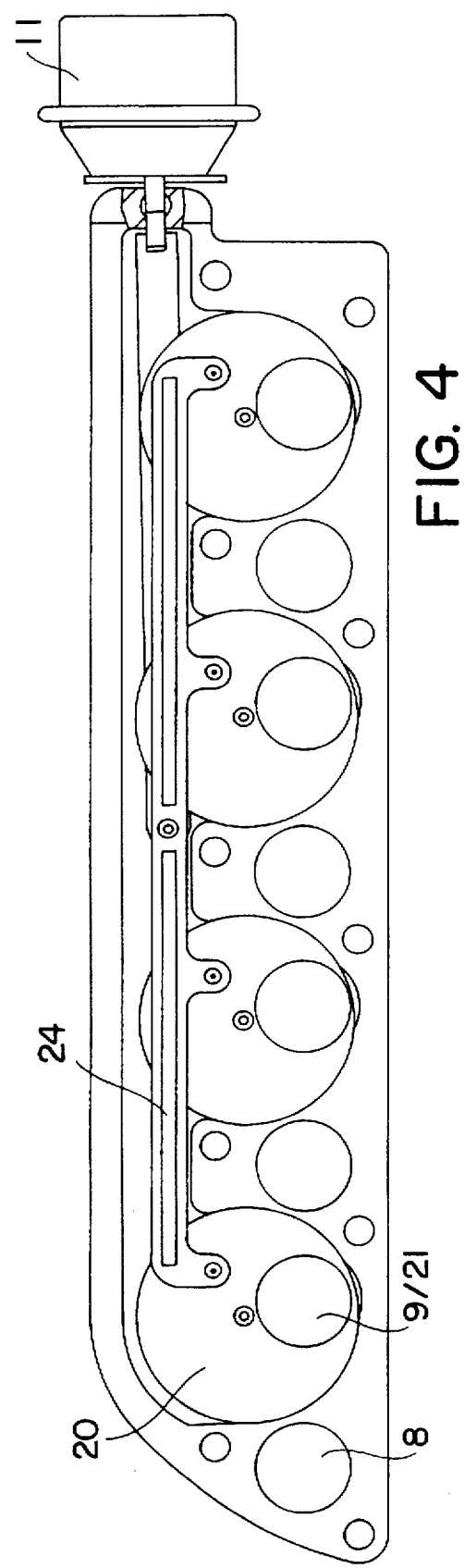

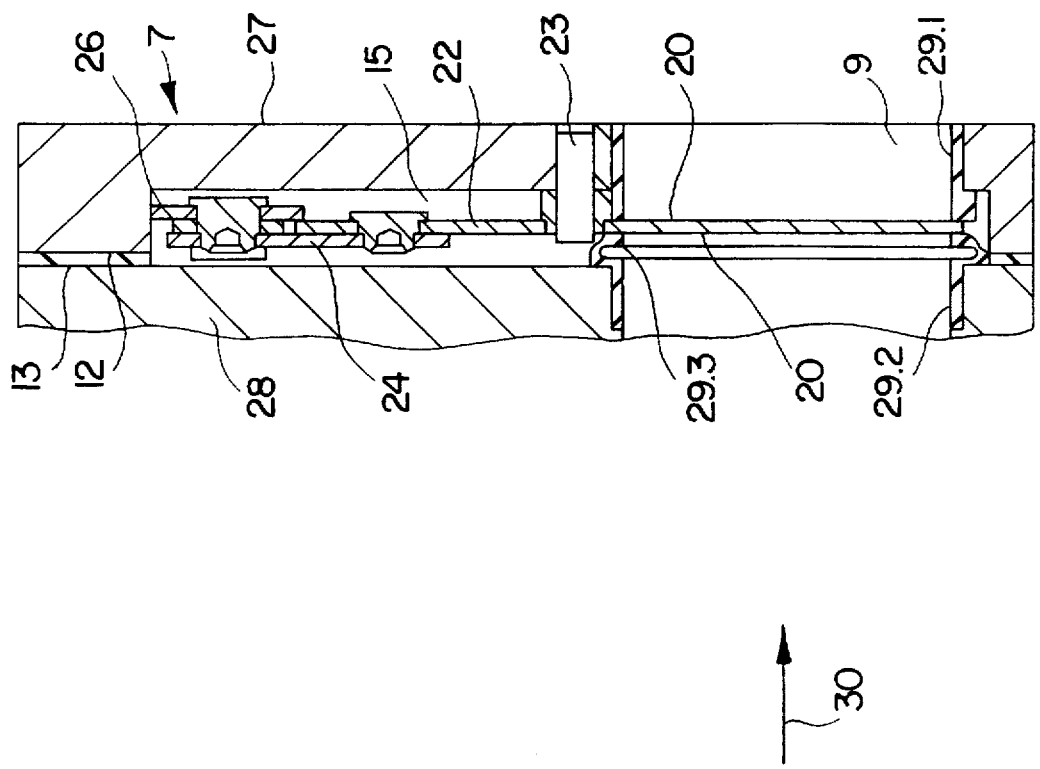

PISTON-TYPE INTERNAL COMBUSTION ENGINE HAVING AT LEAST TWO INTAKE VALVES PER CYLINDER

DESCRIPTION

The invention relates to a piston-type internal combustion engine having at least one cylinder which is provided with a first gas intake port and with at least a second gas intake port which are connected to a feed line, with a gas intake valve being allocated to each gas intake port on the cylinder and with a throttle element being allocated to the second gas intake port for changing the flow cross section.

Piston-type internal combustion engines of the above-identified type are known, for example, from DE-C-36 24 899, DE-A-38 14 835, DE-C-38 36 550 as well as DE-C-39 03 831. By way of arranging two gas intake ports, one of which can be shut off by a throttle element, it is intended that an optimum vortex formation of the drawn-in gas in the interior cylinder chamber is accomplished even at a high engine load when both gas intake ports are open as well as at a low engine load when only one gas inlet port is open. For this purpose, respectively one of the two gas intake ports is provided with a throttle element which is configured in the conventional manner in the form of a swing valve arranged in the gas intake port. The disadvantage of this prior art arrangement is that, when the throttle element is completely open, the throttle element is disposed in the flow channel and, during this process, the flow conditions of the gas flowing by are influenced negatively.

It is the object of the invention to embody a piston-type internal combustion engine of the type identified at the outset such that the throttle element does not have a negative influence on the gas flow if the flow cross section of the respective gas intake port is completely open.

This object is solved according to the invention in that the throttle element is embodied as a flat slide valve which is guided so as to be movable transversely to the axis of the second gas intake port. A throttle element embodied in this manner completely opens the flow cross section in the open position in such a way that, as a result, no disturbing swirls in the gas intake port can occur which might have a negative influence on the formation of the vortex in the cylinder chamber. In embodying the invention, it is provided that the flat slide valve is guided in a slide valve housing having at least one passage opening allocated to the second gas intake port, with it being possible to cover the free flow cross section of the passage opening by the flat slide valve. This arrangement has the advantage that the slide valve arrangement as a whole can be connected with the engine block as an integrated component. Here, it is particularly advantageous if, according to a further embodiment of the invention, the slide valve housing is provided with a passage opening for the first gas intake port. This makes it possible to design the slide valve housing for each cylinder as a compact component which can be installed into the flange-mount region for the two gas intake ports, with the one passage opening being closable by means of the flat slide valve, while the other passage opening is embodied as an integrated component of the slide valve housing.

A preferred embodiment of the invention provides that the slide valve surface of the flat slide valve has a closing surface and a passage opening arranged next to one another in the direction of movement. This arrangement has the advantage that the passage opening has a limiting edge in the slide valve itself so that, even in the open position, the flat slide valve can still be guided on its edge. Here, it is particularly advisable for the passage opening to have the shape of the port cross section, but to be embodied slightly larger than the free flow cross section of the second gas intake port or the corresponding passage opening in the slide valve housing. This compensates for production tolerances and eliminates expensive adjustment processes during the first assembly or for replacement in case of wear.

A further advantageous embodiment of the invention provides that at least one seal is allocated to the flat slide valve, which seal rests against a slide valve surface and which, with its edge, limits the free passage cross section of the passage opening in the slide valve housing. This ensures a perfect sealing of the second gas intake port in the closed position. Here it is particularly advantageous if, on the inflow side of the slide valve surface, the edge of the seal is embodied in the manner of a lip. If the slide valve is in the closed position, the sealing effect is reinforced by the intake pipe vacuum and, as the case may be, also by the charging pressure. If the slide valve surface is embodied such that a passage opening is disposed next to its closing surface, this seal is supported on all sides by the slide valve surface forming the edge of the passage opening, even in the open position, so that, also in this open position, the seal, particularly a seal having a lip-type configuration, is supported in the same deformation position as is the case in the closed position.

An advisable embodiment of the invention further provides that the seal has a pipe-shaped seal body which is inserted into the mouth of the second gas intake port and/or into the intake opening to the cylinder, with the free edge of the seal body forming the seal. Without any special attachment measures, such a component can, in a structurally simple manner, be inserted as a prepared molded part into the respective mouth region of the gas intake port or the intake opening to the cylinder and can be secured. A worn seal body can be replaced easily.

According to a further embodiment of the invention, the flat slide valve is connected to an actuating means which can be moved back and forth and which can be powered. Such actuating means can be realized in a simple manner, particularly for a two-position actuation, i. e., a straight open-closed control, by actuating means which can be operated electromagnetically, pneumatically or hydraulically.

In an advantageous embodiment of the invention, the flat slide valve is guided in the direction of movement of the actuating means. A simple back and forth motion of the flat slide valve can thus be detected directly by the actuating means.

In another advantageous embodiment of the invention, the flat slide valve is pivotably guided around an axis oriented perpendicularly to the slide valve surface. This design allows the flat slide valve to be embodied in the manner of a flat rotary slide valve, furthermore with the option that, by means of a corresponding coupling of the flat slide valve to the actuating means, a transmission ratio can be provided so that, depending on the length of the stroke of the actuating means and the intended transmission, a large or a small pivot angle of the flat slide valve can be represented by means of a predetermined stroke of the actuating means. The pivot speed of the flat slide valve can also be represented by a corresponding transmission ratio in the coupling.

In an embodiment of the invention it is further provided that, in a piston-type internal combustion engine having at least two cylinders, the flat slide valves allocated to each cylinder are connected to an actuating means which effects a joint operation of the slide valves. This arrangement makes it possible, also in engines with multiple cylinders, to house all flat slide valves, including any coupling means and optionally also the actuating means, in a joint slide valve housing which can be connected as integral component with the cylinder head. Here, it is furthermore advisable for the passage openings for the first gas intake ports to be respectively arranged between the flat slide valves for the second gas intake ports in the slide valve housing.

An embodiment of the invention according to the invention [sic] further provides that in a piston-type internal combustion engine having at least two cylinders, a flat slide valve body is provided having several tongue-shaped slide valve elements respectively being provided with the passage opening at their free ends. Such a flat slide valve body allows the operation of the overall arrangement by means of only one actuating means via a straight translatory movement.

In an embodiment of the invention it is further provided that in a piston-type internal combustion machine having at least two cylinders, respectively the second gas intake port is allocated a pivotable flat slide valve each and that the individual flat slide valves are connected with the actuating means via at least one coupling bar, which actuating means can be moved back and forth and which can be powered. Here it is advisable for the individual flat slide valves including the coupling bars to be seated in a joint flat slide valve housing so that this also results in a compact, easily replaceable component. Advisably, in this embodiment, the passage openings for the first gas intake port are also integrated into the slide valve housing so that, overall, a sealing of the slide valve housing takes place over the entire surface against the cylinder head on the one hand and the connecting flange or the connecting flanges of the gas intake ports. Here, the coupling bar may be embodied as axially guided component, which is connected to the individual flat slide valves via corresponding articulations, with the coupling bar with the actuating means being connected to a transmission means acting in the manner of a connecting rod.

To simplify the design of such a slide valve arrangement comprised of multiple pivotable flat slide valves, a further embodiment of the invention provides that the coupling bar on the one hand and the pivotable flat slide valves on the other hand are respectively provided with an intermeshing toothing. This embodiment makes it possible to connect the actuating means directly with the coupling bar so that the latter can carry out a straight back and forth motion and the back and forth motion can be translated into a pivot movement of the flat slide valve via the toothing in the manner of a rack gear. If the respective toothings on the coupling bar on the one hand and on the flat slide valve on the other are respectively arranged on a free edge, this results in a simplified manufacturing option. Such components can be produced, for example, by way of a stamping method. The resulting reduction of components also simplifies the assembly of such a slide valve arrangement.

Figure 2:
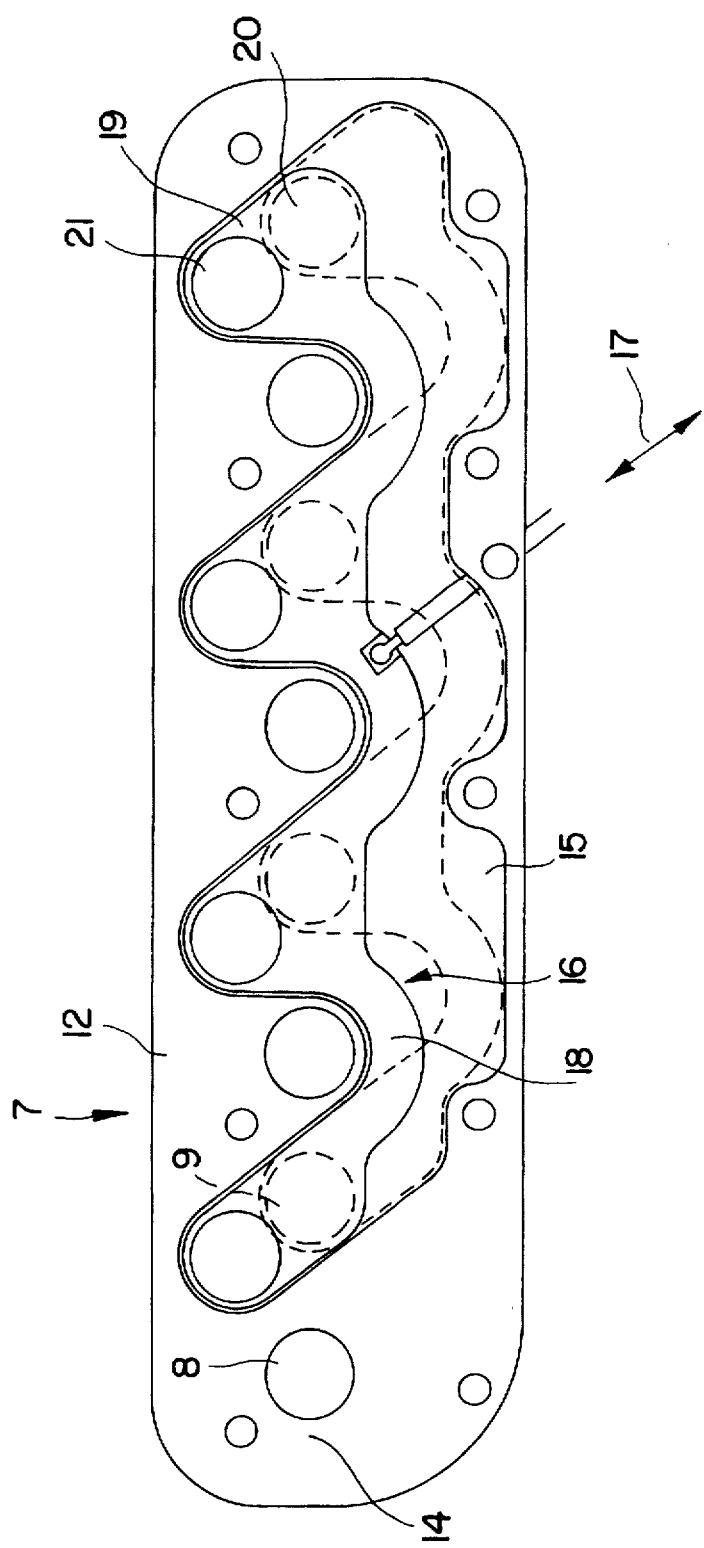
Figure 6:
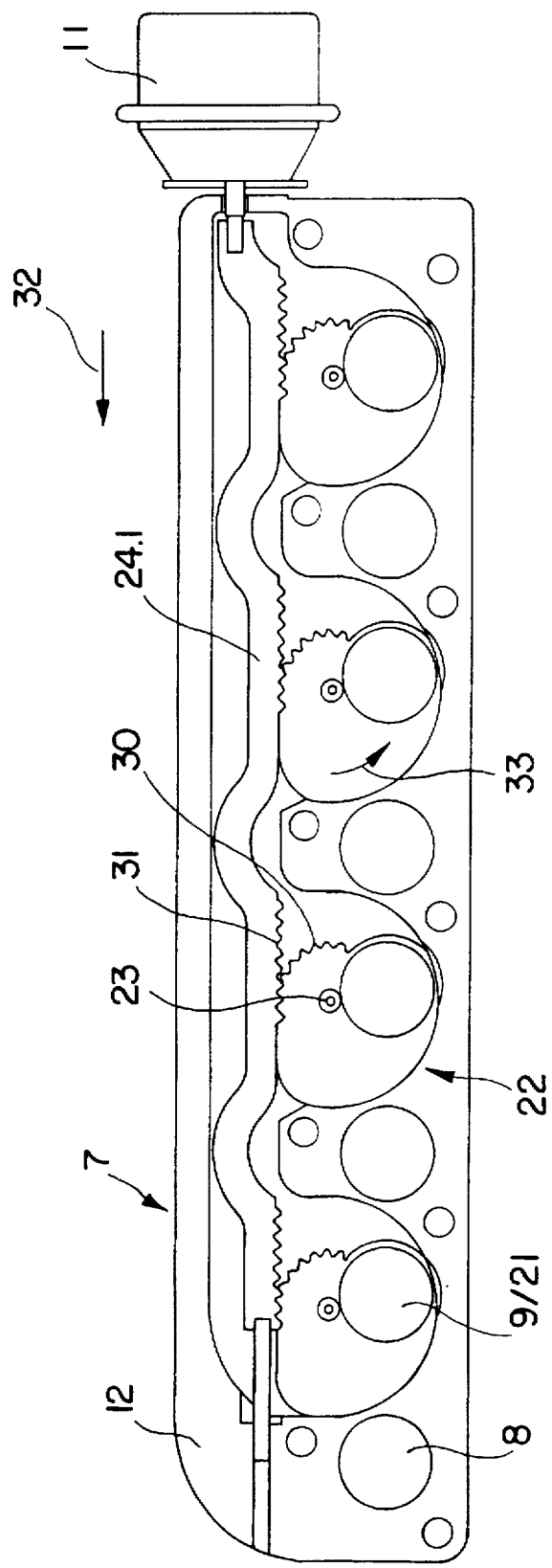

The invention is explained in greater detail by way of embodiments with reference to schematic drawings. The drawings show:

FIG. 1 a cylinder head of a piston-type internal combustion engine in a schematic plan view, FIG. 2 a plan view of a slide valve housing with a flat slide valve that can be moved in a translatory manner, FIG. 3 a plan view of a slide valve housing with a pivotable flat slide valve, FIG. 4 the plan view according to FIG. 3, flat slide valve in open position, FIG. 5 a cut according to the line V-V in FIG. 3, FIG. 6 a different embodiment of a pivotable flat slide valve.

In a plan view, FIG. 1 illustrates a cylinder 1 of a piston-type internal combustion engine, which cylinder is provided with two schematically indicated gas intake valves 2.1 and 2.2 as well as two schematically indicated gas exhaust valves 3.1 and 3.2. An inflow aperture 4.1 for gas intake valve 2.1 and an inflow aperture 4.2 for intake valve 2.2 are respectively provided in the cylinder head. A first gas intake port 5 is allocated to gas intake valve 2.1 and a second gas intake port 6 is allocated to gas intake valve 2.1 [sic]. The first gas intake port 5 as well as the second gas intake port 6 merge into a slide valve housing 7 connected to the cylinder head 7. In the slide valve housing 7, the first gas intake port 5 is allocated a passage opening 8 whose free flow cross section cannot be changed. The second gas intake port 6 is allocated a passage opening 9 in the slide valve housing 7, with the flow cross section being changeable by a throttle element 10 embodied as a flat slide valve. The throttle element 10 is connected to an actuating means 11 which can be powered and which can be activated according to the predetermined input of a change-over device, not shown here in detail. At full engine load and given a high air requirement, the throttle element 10 is completely open so that air or a fuel-air mixture can flow into the cylinder 1 through both the first gas intake port 5 and the second gas intake port 6. At partial load, the throttle element 10 is closed so that the inflow of air or of a fuel-air mixture takes place only through the first gas intake port 5, allowing optimum swirling of the inflowing gas amount in the cylinder, even when the inflow of gas is small.

As can be seen from the schematic illustration according to FIG. 1, the first gas intake port 5 and the second gas intake port 6 are flanged to the slide valve housing 7. The slide valve housing 7 is connected directly to the cylinder head. In a piston-type internal combustion engine having several cylinders arranged in series, each cylinder can be allocated a separate slide valve housing, depending on the design, or the entire bank of cylinders can be provided with one slide valve housing, wherein a throttle element 10 in the form of a flat slide valve is provided for the respectively second gas intake port.

FIG. 2 illustrates a slide valve housing 7 designed for a four-cylinder, piston-type internal combustion engine. In this context, FIG. 2 shows the plan view of the connecting surface 12 of the slide valve housing 7 facing the flange 28, which housing is connected with the flange 28 so as to be sealed via a seal 13 placed in-between (FIG. 1). The passage openings 8 for the respectively first gas intake ports of the respective cylinders are arranged in the slide valve housing 7. The passage openings 9 for the respectively second gas intake port 6 are disposed respectively between the successive passage openings 8 for the respectively first gas intake valves of two adjacent cylinders.

The slide valve housing 7 has a flat milled-out portion 15 wherein a slide valve element 16 is guided in the direction of arrow 17 so as to be movable back and forth in a translatory manner. FIG. 2 illustrates the slide valve element in the closed position.

The slide valve element 16 has a back 18 extending in the longitudinal direction, which back is respectively provided with flat, tongue-shaped slide valves 19. Each flat slide valve 19 has a closing surface 20 which covers the passage opening 9 in the closed position. Each flat side valve 19 is further provided with a passage opening 21 whose contour and free cross section correspond to the contour and the free cross section of passage opening 9. Preferably, the free cross section of the passage opening 21 in the flat slide valve 19 is slightly larger than the free passage cross section of the passage opening 9.

The shape of slide valve element 16 is such that the slide valve element is guided in cooperation with the shape of the tongue-shaped, flat slide valves 19. In the position of slide valve element 16, illustrated here in the closed position, air or an air-fuel mixture can only enter into the cylinder chamber in the correspondingly predetermined low rpm ranges via passage opening 8 which is connected to the first gas intake port 5. At correspondingly predetermined higher rpm's, the slide valve element 16 is pulled back via the actuating means, not shown in detail, in the direction of arrow 17 into the open position, shown in dashed lines, so that the closing surface 20 is pulled back from the passage opening 9 and the latter is opened via the passage opening 21 in the flat slide valve 19. For each cylinder, individual flat slide valves and separate slide valve housings may also be provided, which can be activated by an individual or, again, by a joint actuating means.

In FIG. 3, another embodiment of a flat slide valve arrangement is illustrated in the same manner as the embodiment according to FIG. 2, i. e., again a plan view of the sealing surface 12 of the slide valve housing 7. This embodiment is also intended for a four-cylinder piston-type internal combustion engine. Again, the slide valve housing 7 has passage openings 8 allocated to the respective first gas intake ports as well as passage openings 9 allocated to the respective second gas intake ports. The slide valve arrangement is again shown in the closed position.

In this case, the slide valve housing 17 also has a milled-out portion 15 which is lowered with respect to the sealing surface 12 and which respectively extends over the respective passage openings 9 in a pocket-like manner and which essentially has a circular contour in this region. In this extension region, a disk-shaped, flat slide valve is respectively seated so as to be pivotable around its center axis 23. Again, the flat slide valve has a closing surface 20 which, in the closed position shown here, covers the passage opening 9.

The individual flat slide valves 22 are connected with one another via an articulated, flat coupling element so that during a back and forth movement of the coupling element in the direction of arrow 25, the flat slide valves 22 can be pivoted from the closed position into the open position so that the passage opening 21 of the respective flat slide valve elements is disposed over the allocated passage openings 9 of the respective cylinders and opens the passage. The coupling element 24 is connected via an actuating bar 26 with an actuating means 11, which may be operated, for example, electromagnetically, pneumatically or hydraulically. During operation of the actuating means 11, shown in FIG. 4, the flat slide valve arrangement can be operated such that the individual flat slide valves 22 open the passage opening 9 of the respectively second gas intake port with their passage opening 21.

In an enlarged cross section according to line V-V in FIG. 3, FIG. 5 shows the arrangement of a seal for this embodiment. Here, the flat slide valve 22 is in the closed position so that the passage opening 9 is covered by the closing surface 20. The sectional representation also shows the arrangement of the coupling bar 24 as well as the arrangement of the actuating bar 26. In the sectional representation, the flat-construction shape of the slide valve housing 7 as well as the recess 15 can also be identified. Here, the arrangement is such, as has been indicated above, that the surface 27 rests against the cylinder head, with seal 13 being inserted in-between, and, with a corresponding seal 12.1 being inserted in-between, the surface 12 rests against a flange 28 by means of which the respectively first and second gas intake ports are connected. The advantage of this arrangement, in particular, is that the slide valve arrangement is exposed by way of a simple disassembly of the flange 28.

A tube-shaped seal 29.1 is inserted into the passage opening 9, which seal rests against the closing surface 20 of the flat slide valve 22.

An also tube-shaped sealing body 29.2 is inserted into the corresponding bore in the flange 28, which sealing body is provided with a circumferential sealing lip 29.3 at its end which faces the closing surface 20 of the flat slide valve 22. Since the flow takes place in the direction of arrow 30, i. e., the vacuum is respectively present on the right side of the drawing, the sealing lip 29.3 ensures that, in the closed position of the slide valve, the excess pressure present on the left side of the drawing presses the sealing lip 29.3 against the closing surface 20 of the flat slide valve 22 which cooperates with the sealing lip.

The same allocation of the seals 29.1 and 29.2, optionally also in the form of a seal 29.2 having a sealing lip 29.3, may also be provided in the embodiment according to FIG. 2. In both embodiments, the passage opening 21 is arranged in the flat slide valve (reference numeral 19 in FIG. 2, reference numeral 22 in FIG. 3) such that an edge extending around the passage opening remains so that in both embodiments, also in the open position shown in FIG. 4 for the embodiment according to FIG. 3, the seals 29.1 and 29.2 rest against the edge of the flat slide valve enclosing the passage opening 21 and thus seal the adjoining space of recess 15. This prevents dead spaces.

FIG. 6 illustrates an embodiment which is modified compared to the embodiment according to FIG. 3/4. In this modified embodiment, the flat slide valve 22 is provided over a partial region of its circumference with a toothing 30 extending concentrically to the pivot axis 23. A coupling bar 24.1 is allocated to the toothing 30, which coupling bar is guided in a translatory manner in the slide valve housing 7 and which, in the region of the flat slide valves 22, is respectively provided with a toothing 31 allocated to the toothing 30. The slide valve arrangement according to FIG. 6 is shown in the open position so that, in the event of a displacement of the coupling bar 24.1 in the direction of arrow 32, the flat slide valves 22 are pivoted in the direction of arrow 33 and then reach their closing position. A comparison between the embodiment according to FIG. 4/5 and FIG. 6 shows that in the embodiment according to FIG. 6 the number of components is reduced considerably and thus manufacture and assembly are simplified significantly. The mode of operation of the embodiment according to FIG. 6 corresponds to the mode of operation of the embodiment according to FIG. 3/4. Here, a sealing arrangement as described by way of FIG. 5 is also allocated to the flat slide valve 22.

We claim:

1. An internal combustion engine comprising
   (a) an engine cylinder;
   (b) a first intake port leading to said cylinder for introducing combustion gases thereinto;
   (c) a first intake valve situated at said cylinder in said first intake port;
   (d) a second intake port having a longitudinal axis and leading to said cylinder for introducing combustion gases thereinto;
   (e) a second intake valve situated at said cylinder in said second intake port;
   (f) throttle means situated in said second intake port for varying a flow passage cross section thereof; said throttle means including a flat sliding member movable in a direction of motion thereof perpendicularly to said axis for varying said flow passage cross section;

(g) a slide valve housing having a passage opening aligned with said second intake port; said flat sliding member being guided in said slide valve housing across said passage opening for varying a free flow passage cross section thereof; and (h) a seal held in said slide valve housing; said seal having a sealing face being in a sliding engagement with a surface of said flat sliding member and bounding said passage opening.

2. The internal combustion engine as defined in claim 1, wherein said flat sliding member has a closing surface and a passage opening; said closing surface and said passage opening being arranged adjacent one another as viewed in said direction of motion.

3. The internal combustion engine as defined in claim 1, further comprising means for supporting said flat sliding member for rotary motion about an axis oriented perpendicularly to said flat sliding member.

4. The internal combustion engine as defined in claim 1, further comprising a movable, power-driven setting means having a direction of back-and-forth motion and being connected to said flat sliding member for moving said flat sliding member in said direction of motion of said flat sliding member.

5. The internal combustion engine as defined in claim 4, wherein said direction of motion of said flat sliding member and said direction of back-and-forth motion of said setting means are parallel.

6. The internal combustion engine as defined in claim 1, further wherein said slide valve housing includes an additional passage opening aligned with said first intake port.

7. The internal combustion engine as defined in claim 1, wherein said flat sliding member has an inflow side; said seal having a sealing lip facing said inflow side.

8. The internal combustion engine as defined in claim 1, wherein said seal is a tubular member inserted in said passage opening of said second intake port; a terminal edge of said tubular member forming said sealing face.

* * * * *